(12) United States Patent
Achouri et al.

(10) Patent No.: US 12,199,856 B2
(45) Date of Patent: *Jan. 14, 2025

(54) VEHICLE DATA COMMUNICATION

(71) Applicant: McLaren Applied Limited, Woking (GB)

(72) Inventors: Hakim Achouri, London (GB); Chris Notley, Chertsey (GB); Paul Spence, Guildford (GB)

(73) Assignee: McLaren Applied Limited, Surrey (GB)

( * ) Notice: Subject to any disclaimer, the term of this patent is extended or adjusted under 35 U.S.C. 154(b) by 245 days.

This patent is subject to a terminal disclaimer.

(21) Appl. No.: 17/242,044

(22) Filed: Apr. 27, 2021

(65) Prior Publication Data

US 2021/0297341 A1    Sep. 23, 2021

Related U.S. Application Data

(63) Continuation of application No. 15/121,360, filed as application No. PCT/GB2015/050492 on Feb. 19, 2015, now Pat. No. 11,012,346.

(30) Foreign Application Priority Data

Feb. 25, 2014    (GB) .................................. 1403243.7

(51) Int. Cl.
*H04L 45/24*    (2022.01)
*H04L 67/56*    (2022.01)
(Continued)

(52) U.S. Cl.
CPC .............. *H04L 45/24* (2013.01); *H04L 69/14* (2013.01); *H04L 69/16* (2013.01); *H04W 4/42* (2018.02);
(Continued)

(58) Field of Classification Search
None
See application file for complete search history.

(56) References Cited

U.S. PATENT DOCUMENTS 10,659,569 B1 *   5/2020  Tourrilhes ............... H04L 45/24
10,965,790 B2 *   3/2021  Bonaventure ......... H04W 88/16
(Continued)

FOREIGN PATENT DOCUMENTS

GB         2480349 A       11/2011
JP       2011515032 A       5/2011
(Continued)

OTHER PUBLICATIONS

Raiciu et al., Opportunistic Mobility with Multipath TCP, MobiArch'11, Jun. 28, 2011, pp. 7-12.
(Continued)

*Primary Examiner* — Jeffrey M Rutkowski
*Assistant Examiner* — Ning Li
(74) *Attorney, Agent, or Firm* — Dergosits & Noah LLP; Michael E. Dergosits

(57) ABSTRACT

A communications system for providing data communication to a vehicle (10), the communications system comprising: a mobile transport layer proxy (150) located on the vehicle; a parent transport layer proxy (170) located remote from the vehicle; the mobile transport layer proxy being configured to: accept a transport layer connection with a host device (32, 33), the transport layer connection being addressed to a remote server (160); and communicate with the parent transport layer proxy via multiple paths using a multipath transport layer protocol to communicate on behalf of the host device whilst identifying as the mobile transport layer proxy; and the parent transport layer proxy being configured to: communicate with the mobile transport layer proxy using the multipath transport layer protocol; and (Continued)

communicate with the remote server whilst identifying as the parent transport layer proxy to communicate on behalf of the mobile transport layer proxy to permit the host device to communicate with the remote server.

21 Claims, 2 Drawing Sheets

(51) Int. Cl.
H04L 69/14 (2022.01)
H04L 69/16 (2022.01)
H04W 4/42 (2018.01)
H04W 4/44 (2018.01)
H04W 40/02 (2009.01)
H04W 40/22 (2009.01)
H04W 80/06 (2009.01)

(52) U.S. Cl.
CPC .............. *H04W 4/44* (2018.02); *H04W 40/02* (2013.01); *H04W 80/06* (2013.01)

(56) References Cited

U.S. PATENT DOCUMENTS

| | | |
|---|---|---|
| 2003/0016636 A1 | 1/2003 | Tari et al. |
| 2011/0013605 A1 | 1/2011 | Moeller |
| 2011/0296006 A1 | 12/2011 | Krishnaswamy et al. |
| 2012/0093150 A1* | 4/2012 | Kini ........................ H04L 69/14 370/389 |
| 2012/0099601 A1 | 4/2012 | Haddad et al. |
| 2012/0144062 A1 | 6/2012 | Livet et al. |
| 2012/0182935 A1 | 7/2012 | Addepalli et al. |
| 2013/0215747 A1* | 8/2013 | Jia ..................... H04W 28/0236 370/257 |
| 2015/0215225 A1* | 7/2015 | Mildh ................... H04L 47/263 370/236 |
| 2016/0309534 A1 | 10/2016 | Teyeb et al. |

FOREIGN PATENT DOCUMENTS

| | | | |
|---|---|---|---|
| WO | 2009101004 A1 | 8/2009 | |
| WO | WO-2012006595 A2 * | 1/2012 | ............ H04L 12/66 |
| WO | 2014044333 A1 | 3/2014 | |
| WO | 2015094043 A1 | 6/2015 | |

OTHER PUBLICATIONS

Ford et al., "TCP Extensions for Multipath Operation with Multiple Addresses"; Internet Engineering Task Force (IETF), RFC 6824, Category: Experimental, ISSN:2070-1721, https://tools.ietf.org/html/rfc6824, Jan. 2013.
Costin Raiciu et al., "Opportunistic Mobility With Multipath TCP", Compilation Proceedings of the 9th International Conference on Mobile Systems, Applications, and Services & Co-located Workshops: NSDR'11, MSC'11, MOBIARCH'11, and HOTPLANET'11; Jun. 28-Jul. 1, 2011, Bethesda, MD, USA ACM, New York; US, Jun. 28, 2011, pp. 7-12, XP058004540, DOI: 10.1145/1999916. 1999919, ISBN 978-1-4503-0740-6.
Grounds of Appeal for European Patent No. 3111682, Board of Appeals of the Eurpoean Patent Office, Jul. 23, 2021.
Statement of Dr. John Michael Easton, part of Grounds of Appeal for European Patent No. 3111682, Jul. 16, 2021.
Statement of Dr. Richard James Thomas, part of Grounds of Appeal for European Patent No. 311682, Jul. 15, 2021.

* cited by examiner

VEHICLE DATA COMMUNICATION

CROSS-REFERENCE TO RELATED APPLICATIONS

The present application claims the benefit of U.S. patent application Ser. No. 15/121,360, entitled "Vehicle Data Communication" filed Aug. 24, 2016, which claims the benefit of International Application No. PCT/GB2015/050492, entitled "Vehicle Data Communication" filed Feb. 19, 2015, which claims the benefit of Great Britain Patent Application No. 1403243.7, entitled "Vehicle Data Communication" field on Feb. 25, 2016. The contents of U.S. patent application Ser. No. 15/121,360, International Application No. PCT/GB2015/050492 and Great Britain Patent Application No. 1403243.7 are hereby incorporated by reference.

FIELD OF DISCLOSURE

This invention relates to a communications system for providing data communication to a vehicle. In one example, the vehicle is a train.

BACKGROUND

Vehicles such as cars, buses and trains are examples of passenger carrying vehicles. The passengers that are carried by those vehicles tend to possess devices that connect to the internet to access services provided by remote servers. For example, the passengers may access an email server to check whether they have any new email or access a web server to download web pages. Those devices may be equipped with a wireless network adapter that allows the device to connect to a network that provides access to the internet. The wireless network adapter could be a 3G, 4G or, more generally, cellular modem that can connect to the base stations of a cellular network operator. The wireless network adapter could also be a Wi-Fi adapter.

It is becoming more common for passenger carrying vehicles to connect to the internet and then share this connection with the passenger's devices on-board the vehicle. This shared connection can be used to allow devices that only have a Wi-Fi or wired network adapter to connect to the internet. It is also done because such passenger carrying vehicles generally travel through less densely populated areas where cellular data connections can be of low quality or low signal strength. The construction of the vehicle can also inhibit or reduce the quality of the signal from a base station that can be received by a passenger device inside the vehicle. These points can make it difficult for individual user devices to connect directly to the cellular networks.

Where the vehicle shares a connection among the passengers, the vehicle is equipped with a router that connects to at least one antenna on the external of the vehicle for connecting to wayside base stations. These base stations may be cellular base stations provided by cellular network operators or other wireless base stations such as Wi-Fi base stations. The router will also be equipped with at least one antenna on the internal of the vehicle and/or connected to a wired network which end user devices can use to connect to the internet via the on-vehicle network provided by the router. The router may be comprised of more than one part to provide these connections, for example it may be a cellular modem, a wireless access point and a packet router connected together.

As the vehicle moves along its path of travel, the vehicle will move out of the communication range of certain base stations and in to the communication range of other base stations. The router will therefore need to disconnect from the out of range base station and connect to one within range to continue to provide an internet connection to the end user devices. To aid in this connection jump from one base station to another base station, the router can be equipped with at least two external antennas for connecting to the wayside base stations. The router can then establish a connection to the new base station using one antenna whilst still having a connection via the other antenna to the old base station. The router can then handover from one base station to another without a drop in connection.

As there are multiple cellular network operators within a given country there are normally multiple base stations that serve a particular area. Also, even within one cellular network operators network there will be overlap between the coverage areas of the base stations. This can be used as described above to provide a handover from one base station to another without a drop in connection. However, it would be desirable to be able to make use of the connections provided by the multiple base stations, especially as the data connection provided by a single base station may be of low bandwidth and/or shared between many users. Such a system introduces difficult routing conditions for the on-board router as each data connection is identified separately and so makes it difficult for the on-board router and a server on the internet to communicate in a way that makes efficient use of the multiple connections.

Therefore, there is a need for an improved communication system that allows devices on-board a vehicle to communicate with remote servers using multiple connections.

BRIEF SUMMARY

According to the present invention there is provided a communications system for providing data communication to a vehicle, the communications system comprising: a mobile transport layer proxy located on the vehicle; a parent transport layer proxy located remote from the vehicle; the mobile transport layer proxy being configured to: accept a transport layer connection with a host device, the transport layer connection being addressed to a remote server; and communicate with the parent transport layer proxy via multiple paths using a multipath transport layer protocol to communicate on behalf of the host device whilst identifying as the mobile transport layer proxy; and the parent transport layer proxy being configured to: communicate with the mobile transport layer proxy using the multipath transport layer protocol; and communicate with the remote server whilst identifying as the parent transport layer proxy to communicate on behalf of the mobile transport layer proxy to permit the host device to communicate with the remote server.

The parent transport layer proxy may be configured to accept a connection with the mobile transport layer proxy that is addressed to the remote server. The parent transport layer proxy may be configured to communicate with the mobile transport layer proxy via multiple paths using the multipath transport layer protocol.

The mobile transport layer proxy may be configured to accept the transport layer connection with the host device by intercepting a transport layer session originating from the host device that is addressed for the remote server. The mobile transport layer proxy may be configured to accept the transport layer connection with the host device by masquerading as the remote server and terminating the transport layer session originating from the on-board device at the mobile transport layer proxy.

The parent transport layer proxy may be configured to intercept a transport layer session originating from the mobile transport layer proxy that is addressed for the remote server. The parent transport layer proxy may be configured to masquerade as the remote server and terminates the transport layer session originating from the mobile transport layer session at the parent transport layer proxy.

The mobile transport layer proxy may be connected to a plurality of radio transceivers, each radio transceiver is configured to establish a respective wireless data connection to equipment located remote from the vehicle independently of the other radio transceivers, and each one of the data connections may be one of the multiple paths. The plurality of radio transceivers may be located on the vehicle. Each radio transceiver may establish the respective data connection with a different base station located remote from the vehicle. The base station may comprise one of a number of wayside base station next to a path taken by the vehicle. The vehicle may be a train and the path taken by the vehicle may be a railway track. The base station may be wireless base stations. The base station may be cellular base stations.

The communication system may comprise a mobile router located on the vehicle, the mobile router may comprise the plurality of radio transceivers. The mobile transport layer proxy may form part of the mobile router and the mobile router may communicate with the parent transport layer proxy via multiple paths using the multipath transport layer protocol.

At least one separate subconnection of the multipath transport layer protocol may be established over each of the multiple paths.

The mobile transport layer proxy may be configured to divide a data stream for transmission to the parent transport layer proxy in to a number of substreams at least equal to the number of paths and send a duplicated or different substream over each of the subconnections. A separate subconnection of the multipath transport layer protocol may be established over each of the multiple paths. The mobile transport layer proxy may be configured to divide a data stream for transmission to the parent transport layer proxy in to a number of substreams equal to the number of paths and send a different substream over each of the subconnections. The substreams may be formed of data packets and the mobile transport layer proxy may be configured to incorporate a data stream identifier in to each data packet, the data stream identifier indicating the position of the data packet in the data stream.

The parent transport layer proxy may be configured to divide a data stream for transmission to the mobile transport layer proxy in to a number of substreams at least equal to the number of paths and send a duplicated or different substream over each of the subconnections. A separate subconnection of the multipath transport layer protocol may be established over each of the multiple paths. The parent transport layer proxy may be configured to divide a data stream for transmission to the mobile transport layer proxy in to a number of substreams equal to the number of paths and send a different substream over each of the subconnections. The substreams may be formed of data packets and the parent transport layer proxy may be configured to incorporate a data stream identifier in to each data packet, the data stream identifier indicating the position of the data packet in the data stream.

The multipath transport layer protocol may be Multipath Transmission Control Protocol (MPTCP). The separate subconnections may be separate subflows of the MPTCP. The data stream identifiers may be data sequence numbers.

The parent transport layer proxy may not move with the vehicle. The position of the mobile transport layer proxy may be fixed relative to the vehicle. The mobile transport layer proxy may connect to the host device via a wireless connection.

BRIEF DESCRIPTION OF THE DRAWINGS

The present invention will now be described by way of example with reference to the accompanying drawings. In the drawings.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a communications system for providing data communication to a vehicle, such as a train. The vehicle is provided with a mobile router containing a mobile proxy server that can connect using a multipath transport layer protocol to a parent proxy server for requesting and receiving internet based data on behalf of an on-board end user device that is connected to the mobile router. The parent proxy server requests and receives the internet based data on behalf of the mobile proxy server. The mobile proxy server and the parent proxy server are able to communicate with each other over multiple, distinct paths using a multipath transport layer protocol such as the Multipath Transport Control Protocol (MPTCP) as described in the Internet Engineering Task Force (IETF) RFC 6824. Whilst the specific example of MPTCP is given and discussed in the examples below, it will be readily apparent that an alternative multipath transport layer protocol that permits communications between devices over multiple, distinct paths could be used.

Figure 1:
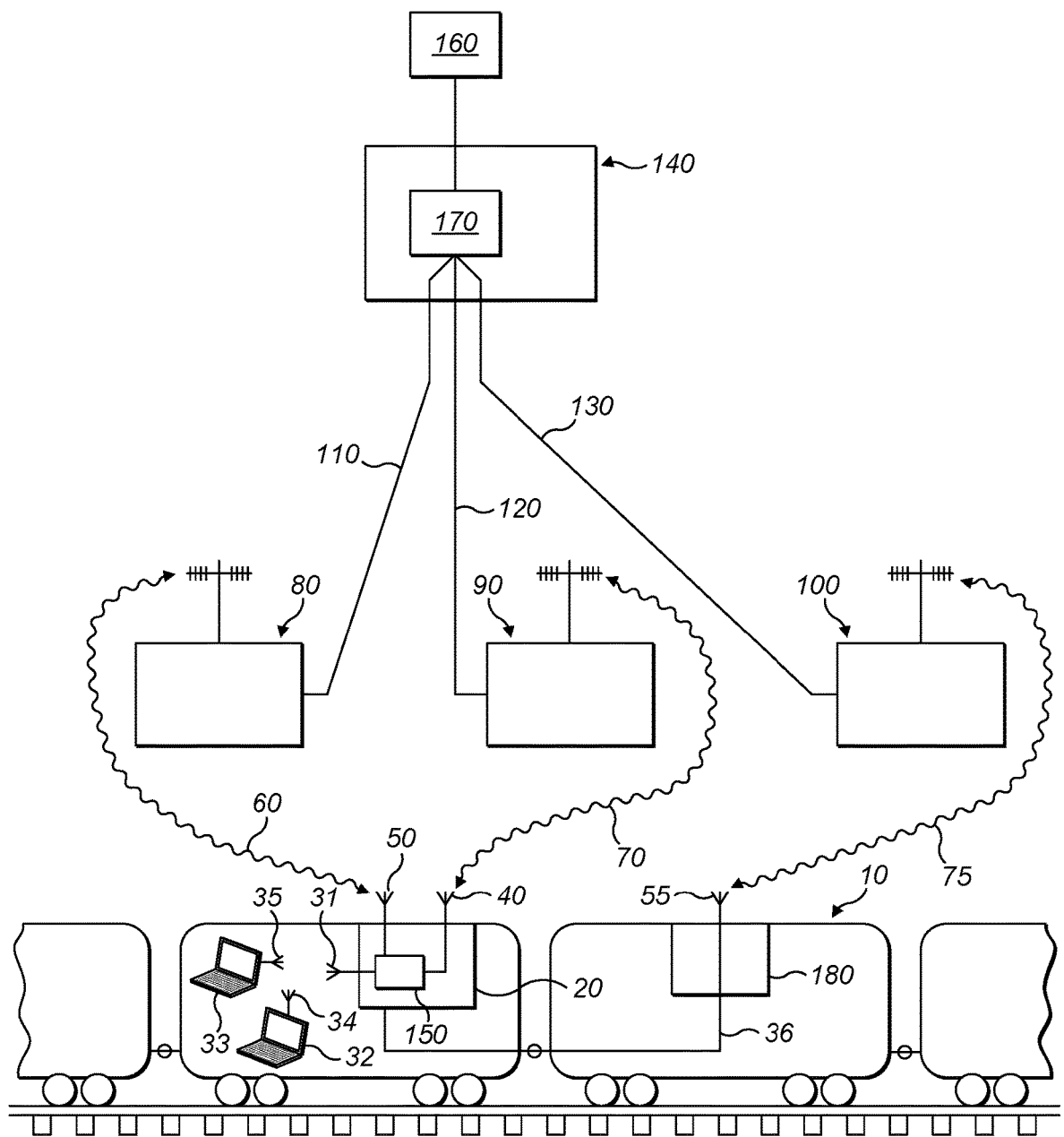
FIG. 1 shows a schematic diagram of a communication system.

FIG. 1 shows a schematic diagram of an example communication system in accordance with the present invention. In FIG. 1, a train 10 is illustrated as travelling along a track 11. This is given as an example and it will be readily apparent that the communication system described below could equally be used on another type of vehicle such as a coach or car travelling along a road.

The train 10 is provided with a mobile router 20. This mobile router 20 is described as mobile in the sense that, whilst its position is fixed relative to the train 10, the mobile router 20 is moves relative to the ground when the train 10 is mobile. The mobile router 20 is equipped with an antenna 31 that enables the mobile router 20 via a radio transceiver to accept wireless, Wi-Fi connections from end-user devices 32, 33. The mobile router 20 can also be attached to wired network 36 for wired connection to the end-user devices 32, 33. The end-user devices 32, 33 connect to the mobile router 20 using respective antenna 34, 35 via respective radio transceivers.

The antenna 31 that the end-user devices 32, 33 connect to may be described as an internal antenna. This is to mean that it will generally be used to connect with devices such as the end-user devices 32, 33 that are located on the inside of the vehicle 10. However, the antenna 31 itself does not necessarily need to be located on the inside of the vehicle nor does it solely have to be used to connect with devices located on the inside of the vehicle.

The mobile router 20 is also equipped with at least two antennas 40, 50 that are connected to respective radio transceivers to provide a respective data connection to ground-based equipment independently of the other radio transceivers. The radio transceivers can include: (a) one or more transceivers each of which can independently establish a data connection 60, 70, 75 with one of a number of wayside base station 80, 90, 100 next to the railway track; and (b) one or more cellular transceivers each of which can independently establish a data connection 60, 70, 75 with cellular base stations 80, 90, 100 of telephone operators. The base stations 80, 90, 100 are connected to respective network connections 110, 120, 130 to allow communication with servers located on the internet.

In the case of the one or more cellular transceivers these can be in the form of 3G or 4G cellular modems which each connect to a cellular base station 80, 90, 100 to establish the data connection 60, 70, 75. In the case of a 4G cellular modem these could operate according to, for example, LTE, WiMAX or HSPA+ standards.

The mobile router 20 can establish data connections with a data centre 140 using the cellular data connections 60, 70, 75 and the respective network connections 110, 120, 130.

As shown in FIG. 1, mobile router 20 can establish data connections with a data centre 140 using data connections that are established by a slave router 180. In this embodiment the mobile router 20 is connected to slave router 180. This connection can be made by a wired data connection 36 or alternatively by a wireless connection. The slave router 180 is equipped with at least one antenna 55 that is connected to a respective radio transceiver to provide a data connection to ground-based equipment independently of the other radio transceivers, in the slave router 180 and the mobile router 20. It can be advantageous to place the mobile router 20 at one end of the vehicle 10 and the slave router 180 at the other end of the vehicle 10. When the vehicle is a long vehicle such as a train, this means that the antennas at opposite ends of the train 10 will experience different network operating conditions and/or be able to connect to different base station 80, 90, 100. This means that the mobile router 20 can make use of as many different base stations as possible, thus improving the quality of the link between the train 10 and the data centre 140.

The mobile router 20 functions as a mobile proxy 150 that intercepts TCP user sessions that originate from the end-user devices 32, 33 and are addressed to a remote server 160 on the internet. The mobile proxy 150 works at the transport layer of the data connections when it intercepts the TCP user sessions. The transport layer is otherwise known as layer 4 of the Open Systems Interconnection (OSI) model. The TCP user sessions are more generally transport layer connections.

In some cases, the local proxy 150 may be a separate device that is connected to the mobile router 20. For example by a wired connection.

When the mobile proxy 150 intercepts the TCP user sessions that originate from the end-user devices 32, 33, the local proxy 150 masquerades as the remote server 160 and so the TCP user session from the end-user device 32, 33 terminates at the mobile proxy 150. The mobile proxy 150 therefore accepts connections that are addressed for a remote server 160 and thus terminates those connections at the mobile proxy 150. The local proxy 150 has the ability to intercept those TCP user sessions because the router 20 passes external network connection requests to the local proxy 150 for inspection. External network connection requests are requests by the end-user devices 32, 33 for resources that are identified as being located in a network that is remote from the local network on-board the train. These external network connection requests could be requesting information from remote servers that are located on the internet.

The mobile proxy 150 is configured to communicate with a remote proxy 170 that is located in the data centre 140. The mobile proxy 150 is configured to request from the remote proxy 170 any data that is located in the remote, external networks. In this way the remote proxy 170 acts as a parent proxy for the mobile proxy 150. In a similar way to the mobile proxy 150 terminating the end-user device connections at the mobile proxy 150, the parent proxy 170 terminates the mobile proxy 150 transport layer data connections at the parent proxy 170.

When an end-user device 32, 33 sends a request for data from remote server 160, as described above, the mobile proxy 150 masquerades as the remote server 160 and terminates the transport layer connection from the end-user device 32, 33 at the mobile proxy 150. The mobile proxy 150 then requests the data requested by the end-user device 32, 33 from the parent proxy 170 on behalf of the end-user device 32, 33. The parent proxy 170 masquerades as the remote server 160 and terminates the transport layer connection from the mobile proxy 150 at the parent proxy 170. The parent proxy 170 then initiates a connection with the remote server 160 and requests the data from the remote server 160 on behalf of the mobile proxy 150 and, indirectly, for the end-user device 32, 33.

The local proxy 150 is capable of communicating using multipath transport layer protocol connections, for example using Multipath TCP (MPTCP) connections. The parent proxy 160 is also capable of communicating using multipath transport layer protocol connections, such as MPTCP connections. Therefore, the local proxy 150 and parent proxy 160 are configured to communicate with each other using a multipath transport layer protocol such as MPTCP.

As discussed above, the mobile router 20 can establish data connections with the data centre 140 using the cellular data connections 60, 70 and the respective network connections 110, 120, 130. This means that the mobile proxy 150 can establish multiple data connections with the remote proxy 170. Each of these separate cellular data connections forms a separate path for the MPTCP connection. Therefore, when there are two separate cellular data connections there will be two separate paths, one for each of the data connections. The wireless data connections, that are not necessarily cellular data connections, can be used in a corresponding way.

The MPTCP protocol can establish a separate subflow over each of the separate paths. The MPTCP protocol can also establish more than one separate subflow over a given path dependent on network conditions. As the quality of a particular path decreases the subflow established over that path may be dropped. If it is detected that the quality of a particular path has improved, or a new path established then a subflow may be established over that path. Within the MPTCP protocol, a subflow is an individual TCP connection that is established between the two communicating devices over that particular path. Therefore, separate TCP connections are established by the MPTCP connection, and so by the two communicating devices, over each of the paths that are being used to form the connection. Within an individual subflow, the normal TCP parameters are used to handle the data transactions within that individual TCP connection. For example, data transferred over an individual subflow will be acknowledged using a standard ACK parameter. The data transactions that occur at the individual subflow level are also monitored at the MPTCP level. For example, there will also be an acknowledgement that occurs at the MPTCP level to acknowledge that a segment of data has been successfully transmitted over one of the subflows.

The separate, multiple paths from the mobile router 20 to external, non-onboard networks are identified as being separate paths because each path has different network layer addresses. The each interface that communicates via a radio transceiver and antenna has a distinct network layer address. The distinct network layer address can be a distinct, different IP address.

MPTCP provides two different ways for these separate paths to be identified to the communicating device at the other end of the connection. The first identification method is for the device with more than one separate connection to initiate a connection from each of the other connections to the remote device. This initiation process establishes the separate subflow with the remote device. The second identification method is for the device with more than one separate connection to advertise to the remote device that the device has more than one separate connection and is capable of communicating over those multiple connections. MPTCP provides for a TCP option that announces additional addresses on which a host can be reached. This address message tells the remote device to add a network layer address to the list of addresses that the local host can be used to communicate with the local host.

Data is transferred over an MPTCP connection by taking one input data stream from an application and split that data stream in to one or more subflows. Control information is included in the subflows to allow the data stream to be reassembled and delivered to the application running on the other end of the link. In the cases described herein, the proxy server 150 running on the mobile router 20 will produce a data stream that is to be sent to the proxy server 170 running in the data centre 140. The MPTCP connection, at the mobile router 20 end, takes the data stream originating from the mobile proxy 150 and splits that data stream in to two or more subflows. Control information is included in each of the subflows so that the data stream can be reassembled at the data centre end of the MPTCP connection. The MPTCP connection can duplicate a particular subflow so that a particular subflow can be sent over more than one path. This can be used to provide resilience to the connection. In the other direction, the parent proxy 170 running in the data centre will produce a data stream that is to be sent to the mobile proxy 150. The MPTCP connection, at the data centre end, takes the data stream originating from the parent proxy 170 and splits that data stream in to two or more subflows. Control information is included in each of the subflows so that the data stream can be reassembled at the mobile router 20 end of the MPTCP connection. The MPTCP connection can duplicate a particular subflow so that a particular subflow can be sent over more than one path. This can be used to provide resilience to the connection.

The control information that is included in the subflow is included in the TCP options of the individual TCP connection that forms the individual subflow. Each data packet sent over the subflow has a subflow sequence number and a data sequence number associated with that data packet. The subflow sequence number is a used at a subflow level to ensure that transmissions sent within that subflow are received correctly. The subflow sequence number is an identifier that identifies the sequence of data sent over a particular path. The data sequence number is used by the receiver to ensure in-order delivery of the data flow to the application layer. As discussed above, in the current case, this means the delivery of data to the proxy server located at each end of the link between the train 10 and the data centre 140.

A range of the data sequence number is mapped to a particular subflow for a particular length of data. This mapping maps a segment of the data sequence number on to the subflow sequence number of a particular path. The receiving device can therefore reassemble the sent data flow by reordering the received data so that the data sequence numbers are in order. The data sequence number is an identifier that identifies the sequence of the data flow sent over the MPTCP connection.

The data that is requested by the end-user device 32, 33 is requested by the mobile proxy 150 from the parent proxy 170 using a MPTCP connection over the multiple paths that are available to the mobile proxy. The parent proxy 170 can then request that data from the remote server 160 using conventional protocols that the remote server 160 supports. Data received for the end-user device 32, 33 at the parent proxy 170 is transmitted to the mobile proxy 150 using the MPTCP connection over the multiple paths. It is then transmitted by the mobile proxy 150 to the end-user device 32, 33 using conventional protocols that are supported by the end-user device 32, 33. As the MPTCP connection is established only between the local 150 and parent 170 proxies the MPTCP connection is hidden from both the end-user devices and the remote servers on the internet. This means that the end-user devices can receive the benefits of using an MPTCP connection without needing to be aware that such a protocol is being used.

By the use of two proxies in series, both of which support MPTCP, or another multiple path transport layer protocol, on the connection between them, the connection from the end-user device to the internet can benefit from MPTCP even if one or both of the end-user device and the internet end point do not support MPTCP.

Figure 2:
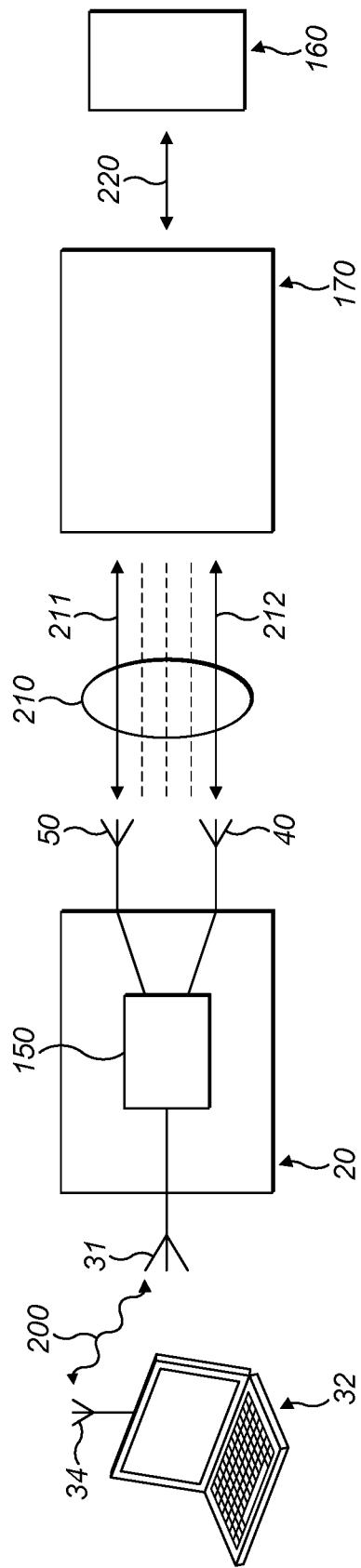
FIG. 2 shows a schematic diagram of the communication of data between an end-user device and a remote server using the communication system.

The communication by end-user device 32 with remote server 160 is explained below with reference to FIG. 2.

The end-user device 32 attempts to form a connection with a remote server 160 to request data from the remote server 160. This connection attempt is sent over a wireless link 200 by the end-user device 32 using a radio transceiver connected to antenna 34. It is received over wireless link 200 by mobile router 20 using a radio transceiver connected to antenna 31. The mobile proxy 150 intercepts the connection attempt and masquerades as the remote server 160. The TCP user session that originates from the end-user device 32 is therefore terminated at the mobile proxy 150. The end-user device 32 believes that it has established a connection to the remote server 160 when in fact it has established a connection with mobile proxy 150.

Mobile router 20 can establish multiple data connections using the multiple radio transceivers that are each attached to a separate antenna 40, 50. These data connections are established with respective base stations. Whilst it is not shown in FIG. 2, the mobile router 20 could be connected to a slave router 180 to provide at least one of the data connections as discussed with reference to FIG. 1 above.

Mobile proxy 150 establishes a connection 210 with parent proxy 170 using the MPTCP protocol. Within the MPTCP connection 210 there are separate subflows 211, 212. There is at least one subflow for each separate path defined by the separate data connections. The separate paths from the mobile router 20 are identified as being separate paths because they each have a different network layer address. For example, they have different IP addresses. The connection 210 established to parent proxy 170 is used to by the mobile proxy 150 to request the data that the end-user device 32 has requested. The mobile proxy 150 therefore requests the data from parent proxy 170 on behalf of the end-user device 32. When the mobile proxy 150 requests this information it identifies as the mobile proxy 150 at the transport layer.

The parent proxy 170 receives the request for data on the remote server from mobile proxy 150 over the MPTCP connection 210. The parent proxy 150 intercepts the request from the mobile proxy 150 and masquerades as the remote server 160. The TCP user session that originates from the mobile proxy 150 is therefore terminated at the remote proxy 170. The mobile proxy 150 believes that it has established a connection to the remote server 160 when in fact it has established a connection with parent proxy 170.

The parent proxy 170 establishes a connection 220 to remote server 160 to request the data from remote server 160 on behalf of the mobile proxy 150 and so indirectly, on behalf of the end-user device 32. The connection 220 established between parent proxy 170 and remote server 160 can be made using conventional protocols and does not need to be a connection that uses a multipath transport layer protocol.

The remote server 160 responds to the request for data by sending response data to parent proxy 170 over the connection 220 established between the remote server 160 and the parent proxy 170. When the parent proxy 170 has received this response data, the parent proxy 170 responds to the request sent by the mobile proxy 150 on behalf of the end-user device 32 over the MPTCP connection 210. The parent proxy 170 will use the multiple subflows 211, 212 of the MPTCP connection 210 that have been established over the respective paths. In this response by the parent proxy 170 to the mobile proxy 150 will be included the response data sent by the remote server 160.

When the mobile proxy 150 has received this response data, the mobile proxy 150 responds to the request sent by the end-user device 32. The mobile proxy 150 includes the response data send by the remote server 160 in the response sent to the end-user device 32 over wireless connection 200. The wireless connection 200 could be a wired connection if the train comprises a wired network to which end-user devices 32, 33 can connect using a wired network adapter.

Whilst the above description has focused on end-user devices 32, 33 that connect via a wireless connection, it should be readily apparent that any host device that requires access to server remote from the on-board environment could use the above described communication system. For example, the host device could be a device that provides data to the on-board vehicle systems. The host device could provide telemetry data to a remote server such as running time or vehicle position.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A communications system for providing data communication to a vehicle, the communications system comprising:
    a mobile transport layer proxy located on the vehicle;
    a parent transport layer proxy located remote from the vehicle;
    the mobile transport layer proxy being configured to:
        accept a transport layer connection with a host device, the host device requesting data from a remote server and the transport layer connection being addressed to the remote server; and
        communicate with the parent transport layer proxy via multiple paths using a multipath transport layer protocol to communicate on behalf of the host device, the mobile transport layer proxy identifying as the mobile transport layer proxy; and
    the parent transport layer proxy being configured to:
        communicate with the mobile transport layer proxy using the multipath transport layer protocol;
        communicate with the remote server while identifying as the parent transport layer proxy to communicate on behalf of the mobile transport layer proxy to permit the host device to communicate with the remote server to request the data requested by the host device; and
        communicate with the remote server while identifying as the parent transport layer proxy at the transport layer to receive response data from the remote server, the response data being in response to the data requested by the host device;
    wherein the parent transport layer proxy is configured to communicate with the mobile transport layer proxy via multiple paths using the multipath transport layer protocol to communicate on behalf of the remote server to send the response data to the mobile transport layer proxy, the parent transport layer proxy addressing the response data to the mobile transport layer proxy rather than the host device, the parent transport layer proxy masquerading as the remote server at the transport layer for the communication with the mobile transport layer proxy such that the mobile transport layer proxy communicates as if the mobile transport layer proxy is communicating with the remote server, and the parent transport layer proxy terminating the transport layer connection from the mobile transport layer proxy at the parent transport layer proxy and the parent transport layer proxy then initiating a connection with the remote server and requesting the data from the remote server on behalf of the mobile transport layer proxy and indirectly for the host device.

2. A communications system as claimed in claim 1, wherein the parent transport layer proxy is configured to accept a connection with the mobile transport layer proxy that is addressed to the remote server.

3. A communications system as claimed in claim 1, wherein the parent transport layer proxy is configured to communicate with the mobile transport layer proxy via multiple paths using the multipath transport layer protocol.

4. A communications system as claimed in claim 1, wherein the mobile transport layer proxy is configured to accept the transport layer connection with the host device by intercepting a transport layer session originating from the host device that is addressed for the remote server.

5. A communications system as claimed in claim 4, wherein the mobile transport layer proxy is configured to accept the transport layer connection with the host device by masquerading as the remote server and terminating the transport layer session originating from the on-board device at the mobile transport layer proxy.

6. A communications system as claimed in claim 1, wherein the parent transport layer proxy is configured to intercept a transport layer session originating from the mobile transport layer proxy that is addressed for the remote server.

7. A communications system as claimed in claim 1, wherein the mobile transport layer proxy is connected to a plurality of radio transceivers, each radio transceiver is configured to establish a respective wireless data connection to equipment located remote from the vehicle independently of the other radio transceivers, and each one of the data connections is one of the multiple paths.

8. A communications system as claimed in claim 7, wherein the plurality of radio transceivers are located on the vehicle.

9. A communications system as claimed in claim 7, wherein each radio transceiver establishes the respective data connection with a different one of a plurality of base stations located remote from the vehicle.

10. A communications system as claimed in claim 9, wherein each of the plurality of base stations comprises one of a number of wayside base station next to a path taken by the vehicle.

11. A communications system as claimed in claim 10, wherein the vehicle is a train and the path taken by the vehicle is a railway track.

12. A communications system as claimed in claim 7, the communication system comprising a mobile router located on the vehicle, the mobile router comprising the plurality of radio transceivers.

13. A communications system as claimed in claim 12, wherein the mobile transport layer proxy forms part of the mobile router and the mobile router communicates with the parent transport layer proxy via multiple paths using the multipath transport layer protocol.

14. A communications system as claimed in claim 1, wherein at least one separate subconnection of the multipath transport layer protocol is established over each of the multiple paths.

15. A communications system as claimed in claim 14, the mobile transport layer proxy being configured to divide a data stream for transmission to the parent transport layer proxy into a number of substreams at least equal to the number of paths and send a duplicated or different substream over each of the subconnections.

16. A communications system as claimed in claim 15, wherein the substreams are formed of data packets and the mobile transport layer proxy is configured to incorporate a data stream identifier into each data packet, the data stream identifier indicating the position of the data packet in the data stream.

17. A communications system as claimed in claim 14, wherein the mobile transport layer proxy is configured to divide a data stream for transmission to the parent transport layer proxy into a number of substreams equal to the number of paths and send a different substream over each of the subconnections.

18. A communications system as claimed in claim 14, wherein the multipath transport layer protocol is Multipath Transmission Control Protocol (MPTCP), and wherein the at least one separate subconnection is a separate subflow of the MPTCP.

19. A communications system as claimed in claim 1, wherein a separate subconnection of the multipath transport layer protocol is established over each of the multiple paths.

20. A communications system as claimed in claim 1, wherein the multipath transport layer protocol is Multipath Transmission Control Protocol (MPTCP).

21. A communications system as claimed in claim 1, wherein the parent transport layer proxy does not move with the vehicle, and wherein the position of the mobile transport layer proxy is fixed relative to the vehicle.

* * * * *